(12) United States Patent
Huang et al.

(10) Patent No.: US 11,657,480 B2
(45) Date of Patent: May 23, 2023

(54) METHOD OF IMPROVING QUALITY OF ULTRASOUND IMAGE AND RELATED ULTRASOUND DETECTION SYSTEM

(71) Applicant: QISDA CORPORATION, Taoyuan (TW)

(72) Inventors: Ssu-Hua Huang, Taichung (TW); Jian-Guo Huang, Hualien County (TW)

(73) Assignee: Qisda Corporation, Taoyuan (TW)

(*) Notice: Subject to any disclaimer, the term of this patent is extended or adjusted under 35 U.S.C. 154(b) by 341 days.

(21) Appl. No.: 17/133,552

(22) Filed: Dec. 23, 2020

(65) Prior Publication Data

US 2021/0256660 A1   Aug. 19, 2021

(30) Foreign Application Priority Data

Feb. 14, 2020   (TW) .................................. 109104711

(51) Int. Cl.
| | |
|---|---|
| *G06T 5/00* | (2006.01) |
| *G06T 5/10* | (2006.01) |
| *G06K 9/00* | (2022.01) |
| *G06T 3/40* | (2006.01) |

(52) U.S. Cl.
CPC .............. *G06T 5/002* (2013.01); *G06T 3/40* (2013.01); *G06T 5/10* (2013.01); *G06T 2207/10132* (2013.01); *G06T 2207/20182* (2013.01)

(58) Field of Classification Search
None
See application file for complete search history.

(56) References Cited

U.S. PATENT DOCUMENTS

| | | | | |
|---|---|---|---|---|
| 2012/0087564 A1* | 4/2012 | Tsujita | ................. | A61B 8/5223 382/131 |
| 2015/0224801 A1* | 8/2015 | Nakamura | ............. | B41J 11/008 347/19 |
| 2019/0180454 A1* | 6/2019 | Choudhury | .......... | H04N 19/139 |
| 2019/0347803 A1* | 11/2019 | Lim | .......................... | G06T 7/11 |
| 2020/0311946 A1* | 10/2020 | Price | ....................... | G06V 10/56 |
| 2020/0320713 A1* | 10/2020 | Furukawa | ................ | G06T 7/187 |
| 2021/0365725 A1* | 11/2021 | Ellison | .................. | G06T 3/4038 |
| 2022/0181020 A1* | 6/2022 | Keshavjee | ............. | G16H 50/30 |
| 2022/0256116 A1* | 8/2022 | Chu | ......................... | H04N 7/15 |
| 2022/0327777 A1* | 10/2022 | Buibas | .................... | G06T 15/04 |

FOREIGN PATENT DOCUMENTS

WO   WO-0224075 A1 *   3/2002   ............... A61B 8/08

* cited by examiner

*Primary Examiner* — Randolph I Chu (57) ABSTRACT

For an ultrasound image acquired by an ultrasound detection system, background data with small noises are first filtered. Next, a binary image is generated by performing image binarization on the noise-reduced ultrasound image based on a first threshold value, wherein the binary image contains information associated with the body of high-echo foreground images in the ultrasound image. An output image is generated by performing foreground expansion on the binary image based on the pixel value of the ultrasound image and a second threshold value smaller than the first threshold value, wherein the output image contains information associated with not only the body but also the outline of high-echo foreground images in the ultrasound image. An improved ultrasound image is generated by performing a post-processing on the ultrasound image according to information of foreground and non-foreground region in the output image.

20 Claims, 7 Drawing Sheets

METHOD OF IMPROVING QUALITY OF ULTRASOUND IMAGE AND RELATED ULTRASOUND DETECTION SYSTEM

CROSS REFERENCE TO RELATED APPLICATION

This application claims priority of Taiwan Application No. 109104711 filed on 2020 Feb. 14.

BACKGROUND OF THE INVENTION

1. Field of the Invention

The present invention is related to a method of improving quality of ultrasound image and related ultrasound detection system, and more particularly, to a method of enhancing data identification accuracy and sharpness for improving quality of ultrasound image and related ultrasound detection system.

2. Description of the Prior Art

Ultrasound is sound waves with frequencies higher than the upper audible limit of human hearing. Ultrasound has been widely for military, medical, recreational and industrial purposes, such as ultrasound diagnostic imager, ultrasound microscope, ultrasound diagnostic range finder, and ultrasound detector.

A fish-finder is an ultrasound-based detection system configured to identify and detect underwater movement so as to provide information related to the amount and location of fish. A fish-finder typically uses a transducer which generates sound waves in the ultrasonic range by turning electrical energy into sound. Upon receiving echo sound waves as a result of the ultrasound waves bouncing off an underwater object, the transducer then turns the echo sound waves into electrical energy which can be measured and displayed for showing underwater status.

During the operation of a fish finder, its ultrasound sample images may have poor quality due to bad visibility, bubbles, water waves or other environmental noises. Therefore, there is a need for a method of improving quality of ultrasound image and related ultrasound detection system.

SUMMARY OF THE INVENTION

The present invention provides a method of improving quality of ultrasound images. The method includes receiving an ultrasound sample image, performing a noise reduction procedure on the ultrasound sample image for generating a noise-reduced ultrasound sample image, performing an binarization procedure on the noise-reduced ultrasound image based on a first threshold value for generating a binary image, and performing a foreground expansion procedure on the binary image based on the ultrasound sample image and a second threshold value smaller than the first threshold value for generating an output image. The binary image includes at least one pixel with a grayscale equal to a foreground value and at least one pixel with a grayscale equal to a background value different from the foreground value. The foreground expansion procedure includes determining whether a grayscale of a first pixel located on a first location in the ultrasound sample image is larger than the second threshold value, whether a grayscale of a second pixel located on the first location in the binary image is equal to the foreground value, and whether at least one pixel with a grayscale equal to the foreground value exists within a neighboring region in the binary image; setting a grayscale of a third pixel located on the first location in the output image to the foreground value when determining that the grayscale of the first pixel is larger than the second threshold value and the at least one pixel with the grayscale equal to the foreground value exists within the neighboring region in the binary image; and performing a post-processing procedure on the ultrasound sample image according to foreground and background information of the output image for generating an improved ultrasound sample image.

The present invention also provides a method of improving quality of ultrasound images. The method includes receiving an ultrasound sample image, performing a noise reduction procedure on the ultrasound sample image for generating a noise-reduced ultrasound sample image, performing an binarization procedure on the noise-reduced ultrasound image based on a first threshold value for generating a binary image, and performing a foreground expansion procedure on the binary image based on the ultrasound sample image and a second threshold value smaller than the first threshold value for generating an output image. The binary image includes at least one pixel with a grayscale equal to a foreground value and at least one pixel with a grayscale equal to a background value different from the foreground value. The foreground expansion procedure includes determining whether a grayscale of a first pixel located on a first location in the ultrasound sample image is larger than the second threshold value, whether a grayscale of a second pixel located on the first location in the binary image is equal to the foreground value; setting a grayscale of a third pixel located on the first location in the output image to the foreground value when determining that the grayscale of the second pixel is equal to the foreground value; and generating an improved ultrasound sample image by decreasing one or multiple grayscales of one or multiple specific pixels in the ultrasound sample image wherein the one or multiple specific pixels correspond to one or multiple pixels in the output image each with a grayscale different from the foreground value.

The present invention also provides an ultrasound detection system which includes an ultrasound emitter, an ultrasound receiver, an operational circuit, a scan converter and an image processor. The ultrasound emitter is configured to send an ultrasound signal. The ultrasound receiver is configured to receive an echo signal which is the ultrasound signal reflected by an object. The operational circuit is configured to provide an ultrasound sample image associated with the object according to the ultrasound signal and the echo signal. The scan converter is configured to convert the ultrasound sample image into an ultrasound luminance image with pixels lying in a raster grid pattern. The image processor is configured to perform a noise reduction procedure on the ultrasound sample image for generating a noise-reduced ultrasound sample image; perform an binarization procedure on the noise-reduced ultrasound image based on a first threshold value for generating a binary image, wherein the binary image includes at least one pixel with a grayscale equal to a foreground value and at least one pixel with a grayscale equal to a background value different from the foreground value; perform a foreground expansion procedure on the binary image based on the ultrasound sample image and a second threshold value smaller than the first threshold value for generating an output image. The foreground expansion procedure includes determining whether a grayscale of a first pixel located on a first location in the ultrasound sample image is larger than the second threshold value, whether a grayscale of a second pixel located on the first location in the binary image is equal to the foreground value, and whether at least one pixel with a grayscale equal to the foreground value exists within a neighboring region in the binary image, wherein the second pixel is located within the neighboring region; setting a grayscale of a third pixel located on the first location in the output image to the foreground value when determining that the grayscale of the second pixel in the binary image is equal to the foreground value; setting the grayscale of the third pixel in the output image to the foreground value when determining that the grayscale of the first pixel is larger than the second threshold value and that the at least one pixel with the grayscale equal to the foreground value exists within the neighboring region in the binary image; setting the grayscale of the third pixel in the output image to the background value when determining that the grayscale of the second pixel in the binary image is equal to the background value and that the grayscale of the first pixel is not larger than the second threshold value; setting the grayscale of the third pixel in the output image to the background value when determining that no pixel with a grayscale equal to the foreground value exists within the neighboring region in the binary image; and decreasing one or multiple grayscales of one or multiple specific pixels in the ultrasound sample image for generating an improved ultrasound sample image, wherein the one or multiple specific pixels correspond to one or multiple pixels in the output image each with a grayscale different from the foreground value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
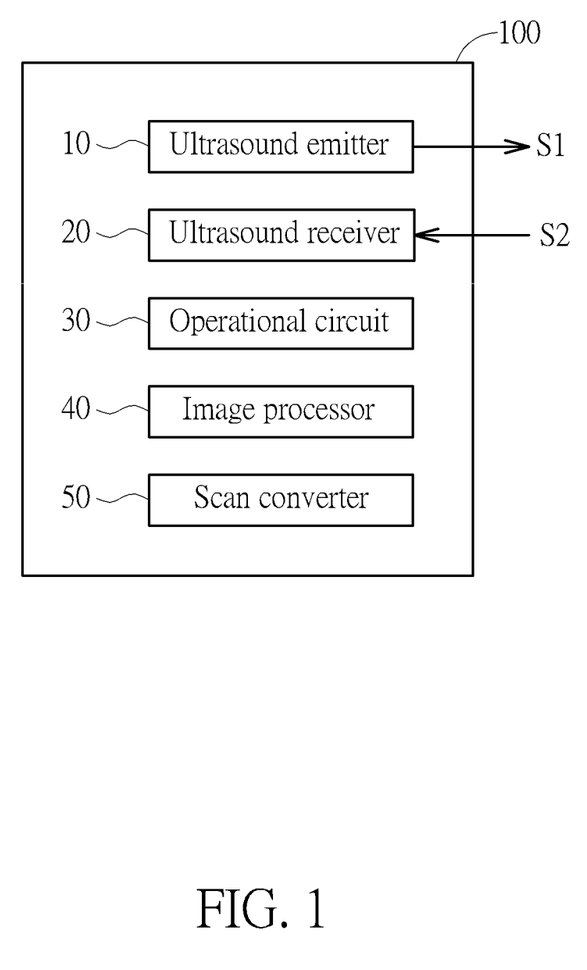
FIG. 1 is a function diagram illustrating an ultrasound detection system according to an embodiment of the present invention.

FIG. 1 is a function diagram illustrating an ultrasound detection system 100 according to an embodiment of the present invention. The ultrasound detection system 100 includes an ultrasound emitter 10, an ultrasound receiver 20, an operational circuit 30, an image processor 40, and a scan converter 50.

Figure 2:
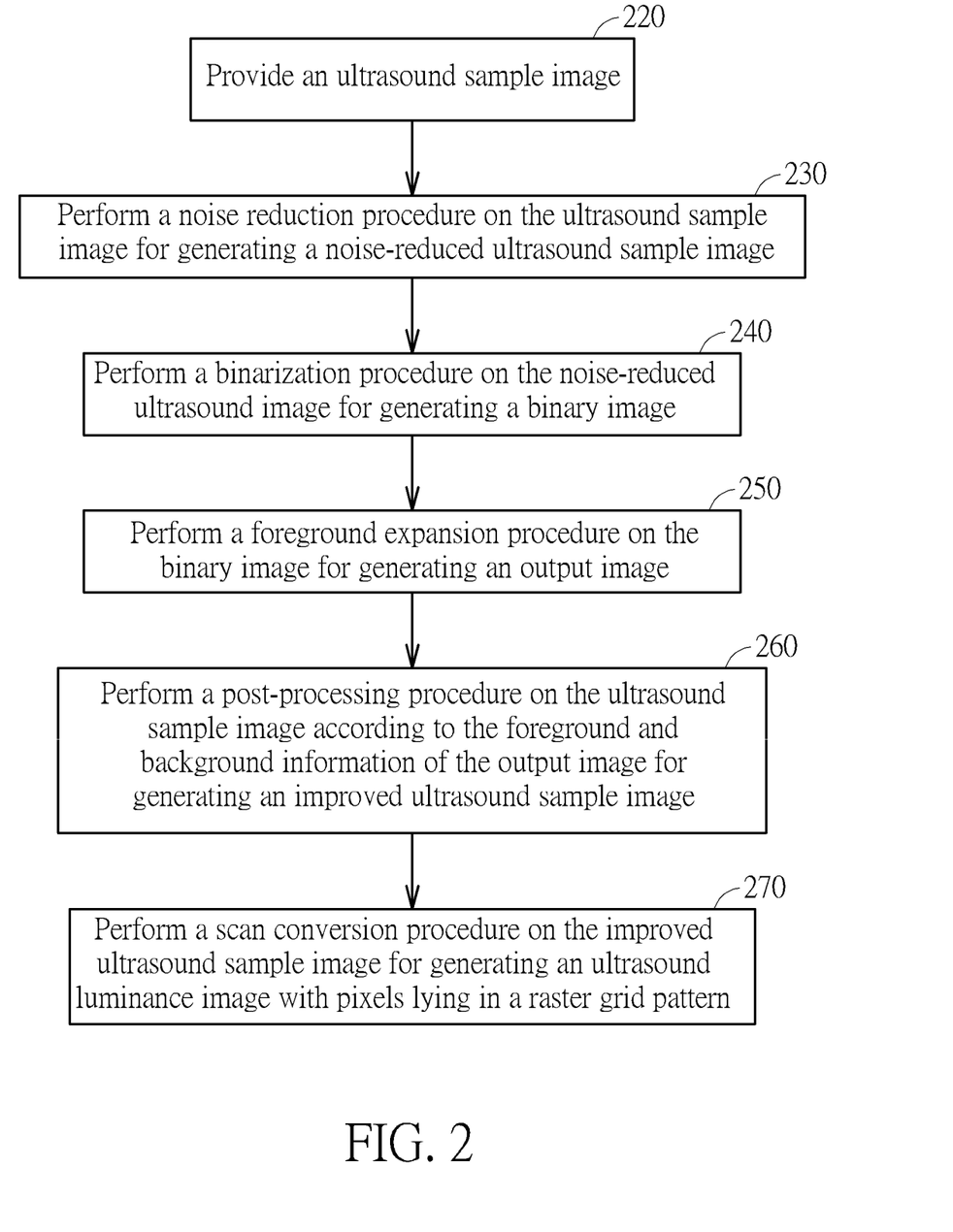
FIG. 2 is a flowchart illustrating the operation of the ultrasound detection system according to an embodiment of the present invention.

FIG. 2 is a flowchart illustrating the operation of the ultrasound detection system 100 according to an embodiment of the present invention. The flowchart in FIG. 2 includes the following steps:

Step 220: provide an ultrasound sample image; execute step 230.

Step 230: perform a noise reduction procedure on the ultrasound sample image for generating a noise-reduced ultrasound sample image; execute step 240.

Step 240: perform a binarization procedure on the noise-reduced ultrasound image for generating a binary image; execute step 250.

Step 250: perform a foreground expansion procedure on the binary image for generating an output image; execute step 260.

Step 260: perform a post-processing procedure on the ultrasound sample image according to the foreground and background information of the output image for generating an improved ultrasound sample image; execute step 270.

Step 270: perform a scan conversion procedure on the improved ultrasound sample image for generating an ultrasound luminance image with pixels lying in a raster grid pattern.

In step 220, the ultrasound detection system 100 may provide an ultrasound sample image using the ultrasound emitter 10, the ultrasound receiver 20, and the operational circuit 30. In the present invention, the ultrasound emitter 10 and the ultrasound receiver 20 may adopt piezo-transistors based on the electrostriction effect or nickel-iron-aluminum alloy based on the magnetostrictive effect. The ultrasound emitter 10 is configured to generate an ultrasound detect signal S1 by converting electrical power into mechanical vibration. The ultrasound receiver 20 is configured to convert an ultrasound echo signal S2 comprising mechanical vibrations into electrical power. In an embodiment, the ultrasound emitter 10 and the ultrasound receiver 20 may be fabricated in the same ultrasound transducer which is configured to switch between emitting/transmitting periods based on a pulse width modulation scheme, by adjusting the duty cycle or using a counter. In another embodiment, the ultrasound emitter 10 and the ultrasound receiver 20 may be fabricated as stand-alone devices. However, the implementation of the ultrasound emitter 10 and the ultrasound receiver 20 does not limit the scope of the present invention.

Ultrasound waves are characterized in high frequency, short wavelength, low diffraction and high directivity. Ultrasound waves echo off liquid, solid, impurities or interfaces with different reflection properties. When ultrasound waves bounce off a moving object, the frequency of the reflected ultrasound waves changes due to Doppler's effect. When the ultrasound detect signal S1 generated by the ultrasound emitter 10 is reflected by an object within its detection range, the corresponding ultrasound echo signal S2 associated the size and the distance of the object may be generated. Therefore, the operational circuit 30 may provide the ultrasound sample image M2 which yields information within its detection range according to the ultrasound detect signal S1 and the ultrasound echo signal S2 in step 220. The ultrasound sample image M2 includes a plurality of pixels with respective grayscales. A row of the ultrasound sample image M2 includes a plurality of pixels each representing a sampling point of a scan line. The grayscale of each pixel may reflect the echo strength of a corresponding sampling point, wherein a larger grayscale means a larger echo.

In most underwater ultrasound range-finding applications, the objects of interest are normally characterized in having large echo and certain size, while non-important background details are normally characterized in having small echo and small size. For example, when the ultrasound detection system 100 is implemented as a fish finder, its sample images may have poor quality due to bad visibility, bubbles, water waves or other environmental noises. In the ultrasound sample image M2 acquired for the fish-finding application, the objects of interest include schools of fish, underwater plants and the bottom of body of water which are characterized in having large echo and certain size, while small-sized bubbles or impurities having larger echo and background details having small echo are non-important information.

In step 230, the image processor 40 is configured to perform a noise reduction procedure on the ultrasound sample image M2 for filtering out small-sized noises. For example, the image processor 40 may generate a downsized image by shrinking the ultrasound sample image M2 by a predetermined factor, filter out the noises in the downsized image, and then enlarge the noise-reduced downsized image by the predetermined factor, thereby generating a noise-reduced ultrasound sample image M3. In an embodiment, the image processor 40 may include a Gaussian filter and a median filter for executing the above-mentioned noise reduction procedure. However, the implementation of the noise reduction procedure does not limit the scope of the present invention.

In step 240, the image processor 40 is configured to perform a binarization procedure on the noise-reduced ultrasound sample image M3 for generating a binary image M4. In the present invention, three grayscale parameters (a first threshold value TH1, a foreground value "a" and a background value "b") associated with the binarization procedure may be defined. The first threshold value TH1 is used to determine whether each pixel in the noise-reduced ultrasound sample image M3 is foreground or background. The foreground value "a" is the grayscale of a foreground pixel, while the background value "b" is the grayscale of a background pixel. When the grayscale of a specific pixel in the noise-reduced ultrasound sample image M3 is larger than the first threshold value TH1, the image processor 40 may determine that the specific pixel is foreground and set the grayscale of a corresponding pixel in the binary image M4 to the foreground value "a". When the grayscale of a specific pixel in the noise-reduced ultrasound sample image M3 is not larger than the first threshold value TH1, the image processor 40 may determine that the specific pixel is background and set the grayscale of a corresponding pixel in the binary image M4 to the background value "b". Therefore, the grayscale of each pixel in the binary image M4 is either equal to the foreground value "a" or equal to the background value "b".

In step 250, the image processor 51 is configured to perform a foreground expansion procedure on the binary image M4 for generating an output image M5. In the present invention, three grayscale parameters (a second threshold value TH2, a foreground value "a" and a background value "b") associated with the foreground expansion procedure may be defined. The second threshold value TH2 is used to determine whether each pixel in the ultrasound sample image M2 is foreground or background, wherein TH2<TH1. The foreground value "a" is the grayscale of a foreground pixel, while the background value "b" is the grayscale of a background pixel.

In an embodiment, the foreground value "a" may be 1 and the background value "b" may be 0. In another embodiment, the foreground value "a" and the background value "b" may be two different grayscale values. The foreground value "a" and the background value "b" may be user default values inputted by a user, system default values determined by software program, or appropriate default values calculated by the operational circuit 30 based on one or multiple input images. The user or the ultrasound detection system 100 may adjust the foreground value "a" and the background value "b" anytime during the operation of the ultrasound detection system 10. However, the values of the grayscale parameters associated with the binarization procedure or the foreground expansion procedure do not limit the scope of the present invention.

After each step of image processing, the ultrasound sample image M2 acquired in step 220 may be presented as the noise-reduced ultrasound sample image M3 acquired in step 230, by the binary image M4 acquired in step 240, by the output image M5 acquired in step 250, and by the improved ultrasound sample image M6 acquired in step 260. More specifically, the ultrasound sample image M2, the noise-reduced ultrasound sample image M3, the binary image M4, the output image M5 and the improved ultrasound sample image M6 have the same resolution, wherein the pixels located on the same location in these images correspond to the same sampling point.

FIGS. 3-7 are diagrams illustrating the operation of the ultrasound detection system 100 when performing the foreground expansion procedure in step 250 according to embodiments of the present invention. For illustrative purpose, in the binary image M4 and the output image M5, each pixel with grayscale equal to the foreground value "a" is represented by a star mark, and each pixel with grayscale equal to the background value "b" is represented by a cross mark.

For a first pixel PX1 located on a first location in the ultrasound sample image M2, a second pixel PX2 located on the first location in the binary image M4, and a third pixel PX3 located on the first location in the output image M5, the image processor 40 is configured to determine whether the grayscale of the first pixel PX1 in the ultrasound sample image M2 is larger than the second threshold value TH2, whether the grayscale of the second pixel PX2 in the binary image M4 is equal to the foreground value "a", and whether at least one pixel with grayscale equal to the foreground value "a" exists in a neighboring region 55 of the binary image M4, wherein the second pixel PX2 is located within the neighboring region 55. The image processor 40 may then set the grayscale of the third pixel PX3 according to the above-mentioned determining results.

Figure 3:
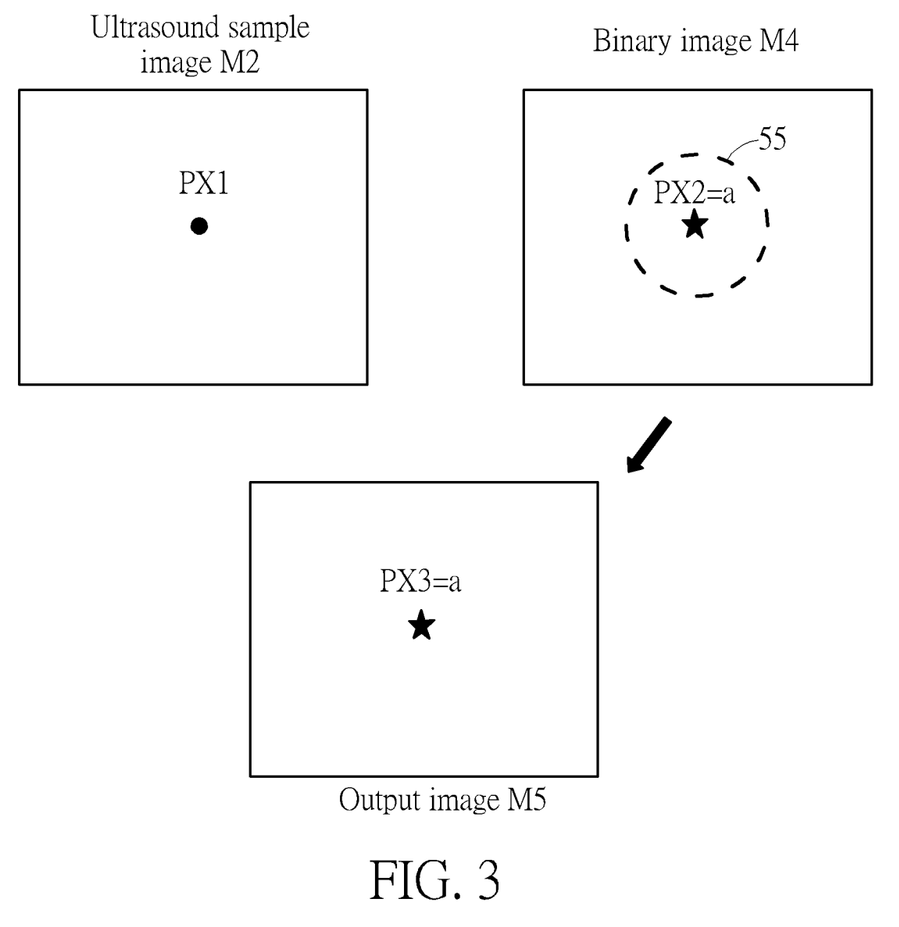
FIG. 3 is a diagram illustrating the operation of the ultrasound detection system when performing a foreground expansion procedure in according to an embodiment of the present invention.

In the embodiment illustrated in FIG. 3, the first pixel PX1 in the ultrasound sample image M2 corresponds to the second pixel PX2 in the binary image M4 with grayscale equal to the foreground value "a". Under such circumstance, the image processor 40 is configured to set the grayscale of the third pixel PX3 in the output image M5 to the foreground value "a".

Figure 4:
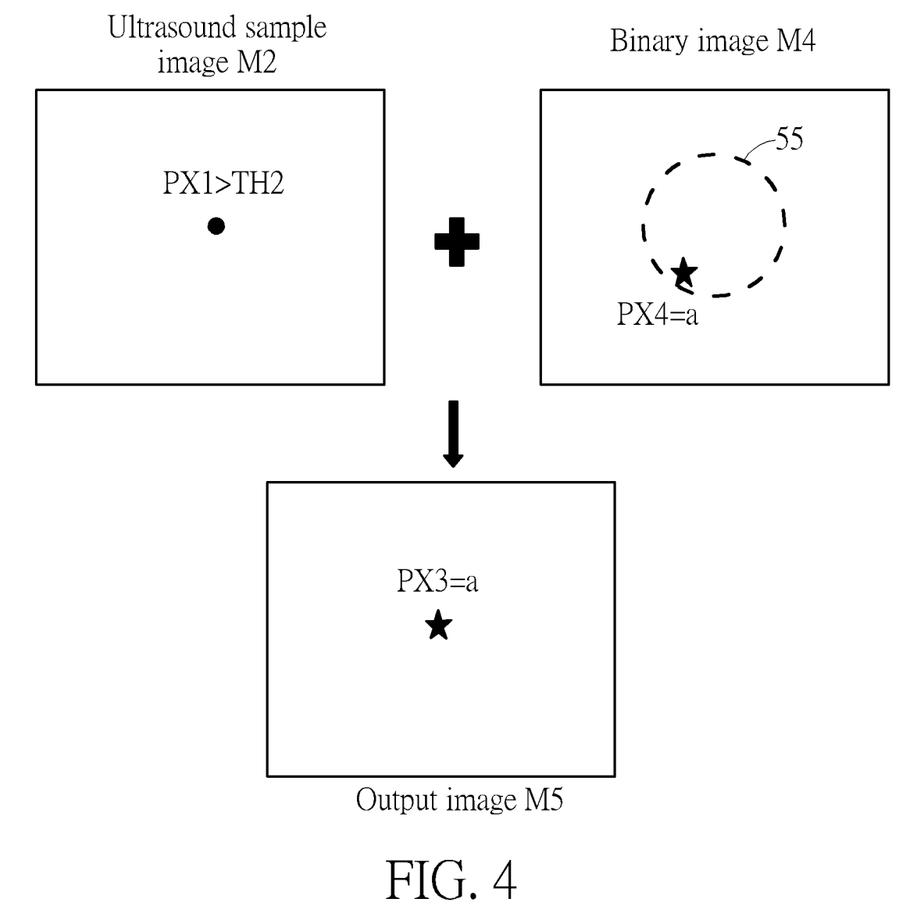
FIG. 4 is a diagram illustrating the operation of the ultrasound detection system when performing a foreground expansion procedure according to another embodiment of the present invention.

In the embodiment illustrated in FIG. 4, the grayscale of the first pixel PX1 in the ultrasound sample image M2 is larger than the second threshold value TH2, and a pixel PX4 with grayscale equal to the foreground value "a" exists in the neighboring region 55 of the binary image M4. Under such circumstance, the image processor 40 is configured to set the grayscale of the third pixel PX3 in the output image M5 to the foreground value "a".

Figure 5:
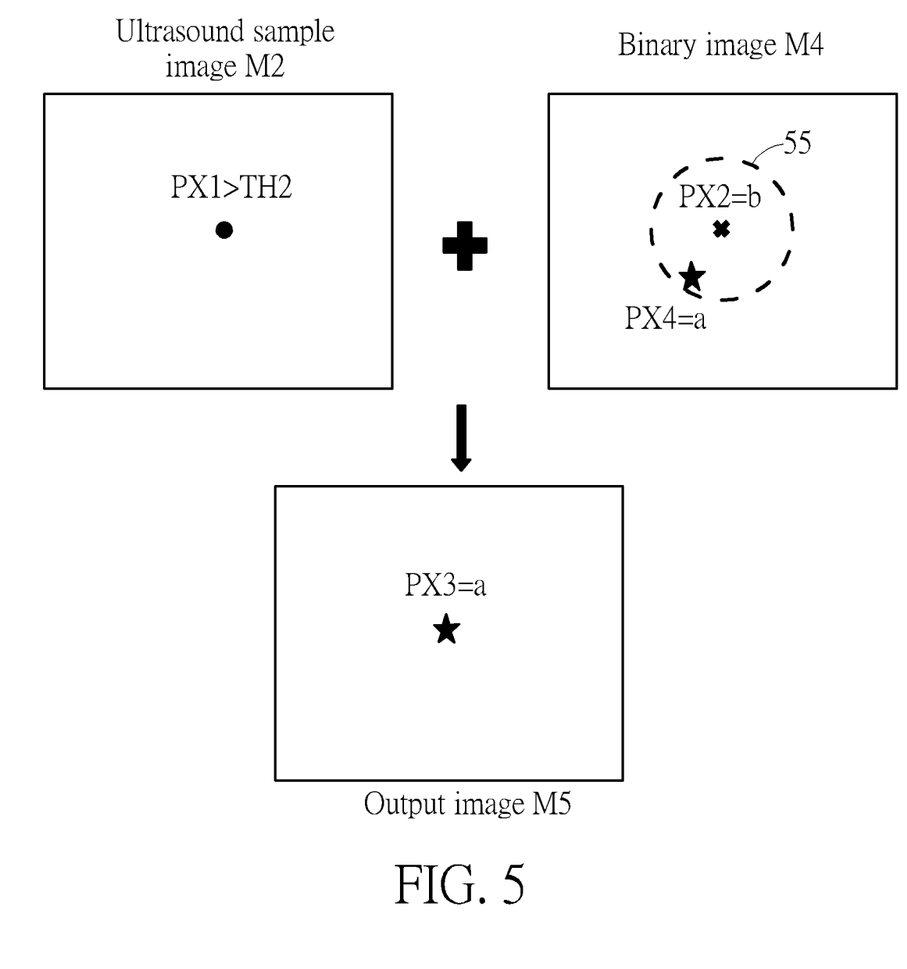
FIG. 5 is a diagram illustrating the operation of the ultrasound detection system when performing a foreground expansion procedure according to another embodiment of the present invention.

In the embodiment illustrated in FIG. 5, the grayscale of the first pixel PX1 in the ultrasound sample image M2 is larger than the second threshold value TH2, the grayscale of the second pixel PX2 in the binary image M4 is equal to the background value "b", and a pixel PX4 with grayscale equal to the foreground value "a" exists in the neighboring region 55 of the binary image M4. Under such circumstance, the image processor 40 is configured to set the grayscale of the third pixel PX3 in the output image M5 to the foreground value "a".

Figure 6:
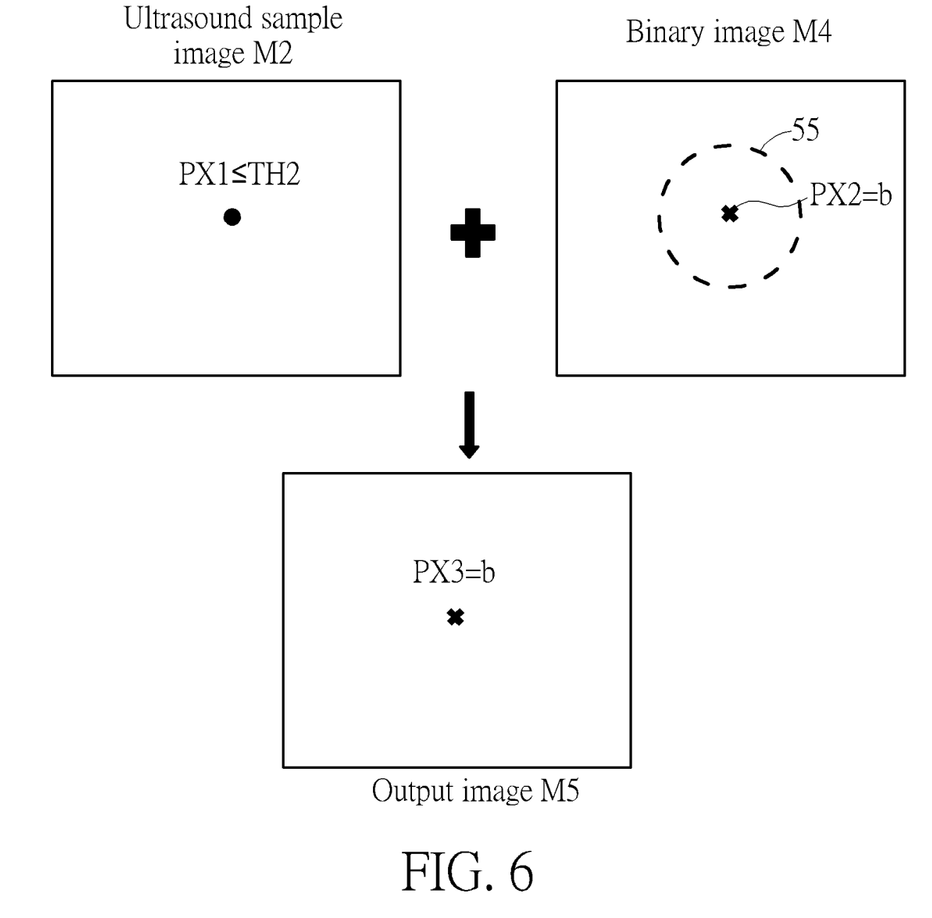
FIG. 6 is a diagram illustrating the operation of the ultrasound detection system when performing a foreground expansion procedure according to another embodiment of the present invention.

In the embodiment illustrated in FIG. 6, the grayscale of the first pixel PX1 in the ultrasound sample image M2 is not larger than the second threshold value TH2 and the grayscale of the second pixel PX2 in the binary image M4 is equal to the background value "b". Under such circumstance, the image processor 40 is configured to set the grayscale of the third pixel PX3 in the output image M5 to the background value "b".

Figure 7:
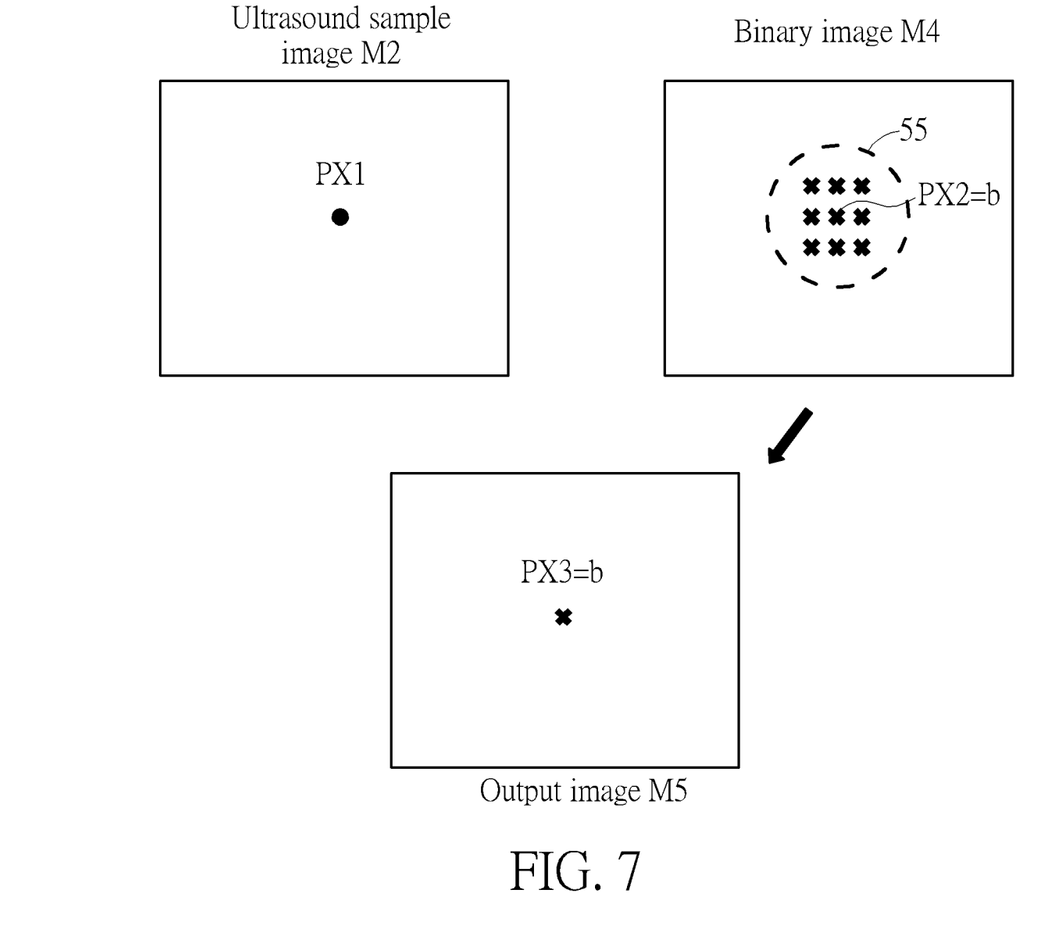
FIG. 7 is a diagram illustrating the operation of the ultrasound detection system when performing a foreground expansion procedure according to another embodiment of the present invention.

In the embodiment illustrated in FIG. 7, the neighboring region 55 of the binary image M4 does not include any pixel with grayscale equal to the foreground value "a". Under such circumstance, the image processor 40 is configured to set the grayscale of the third pixel PX3 in the output image M5 to the background value "b".

Although the foreground image is much brighter than the background image, there is brightness difference between the body and the edge of the foreground image, wherein the edge of the foreground image is slightly darker than the body of the foreground image. Therefore, in the present invention, the first threshold value TH1 is used to determine the body of the foreground image, and then the second threshold value TH2 smaller than the first threshold value TH1 is used to determine the edge of the foreground image.

As depicted in FIG. 3, if the grayscale of the second pixel PX2 in the binary image M4 is equal to the foreground value "a", it indicates that the first location may belong to the body of the foreground image. Under such circumstance, the grayscale of the third pixel PX3 in the output image M5 may be set to the foreground value "a".

As depicted in FIG. 4, with the grayscale of the first pixel PX1 in the ultrasound sample image M2 larger than the second threshold value TH2, if a pixel PX4 with grayscale equal to the foreground value "a" exists in the neighboring region 55 of the binary image M4, it indicates that the first location may belong to the body or the edge of the foreground image. Under such circumstance, the grayscale of the third pixel PX3 in the output image M5 may be set to the foreground value "a".

As depicted in FIG. 5, with the grayscale of the first pixel PX1 in the ultrasound sample image M2 larger than the second threshold value TH2, if the grayscale of the first pixel PX1 in the ultrasound sample image M2 is not larger than the first threshold value TH1, the grayscale of the second pixel PX2 in the binary image M4 acquired in step 240 is set to the background value "b". However, if a pixel PX4 with grayscale equal to the foreground value "a" exists in the neighboring region 55 of the binary image M4, it indicates that the first location may belong to the edge of the foreground image. Under such circumstance, the grayscale of the third pixel PX3 in the output image M5 may be set to the foreground value "a".

As depicted in FIG. 6, when the grayscale of the first pixel PX1 in the ultrasound sample image M2 is not larger than the second threshold value TH2 and the grayscale of the second pixel PX2 in the binary image M4 is equal to the background value "b", it indicates that the first location may belong to unimportant background image. Under such circumstance, the grayscale of the third pixel PX3 in the output image M5 may be set to the background value "b".

As depicted in FIG. 7, if the neighboring region 55 of the binary image M4 does not include any pixel with grayscale equal to the foreground value "a", it indicates that the first location may belong to unimportant background image. Under such circumstance, the grayscale of the third pixel PX3 in the output image M5 may be set to the background value "b".

In step 260, the image processor 40 is configured to perform a post-processing procedure on the ultrasound sample image M2 according to the foreground and background information of the output image M5 for generating an improved ultrasound sample image M6. In an embodiment, a grayscale value "c" associated with the post-processing procedure may be defined, wherein the grayscale value "c" is equal to a constant value which is not larger than the second threshold value TH2. More specifically, when the grayscale of a ninth pixel PX9 located on a third location of the output image M5 is equal to the background value "b", the image processor 40 is configured to set the grayscale of a tenth pixel PX10 in the improved ultrasound sample image M6 to the grayscale value "c", thereby removing or inhibiting unimportant background information. When the grayscale of the ninth pixel PX9 is equal to the foreground value "a", the image processor 40 is configured to set the grayscale of the tenth pixel PX10 to the grayscale of an eleventh pixel PX11 located on the third location of the ultrasound sample image M2.

In another embodiment of executing step 260, the post-processing procedure includes performing a dynamic range adjusting procedure on the ultrasound sample image M2 according to the foreground and background information of the output image M5, thereby generating an improved ultrasound sample image M6. In yet another embodiment of executing step 260, the post-processing procedure includes performing an image-enhancing procedure on the ultrasound sample image M2 according to the foreground and background information of the output image M5, thereby generating an improved ultrasound sample image M6. The above-mentioned image-enhancing procedure may be performed by adjusting the grayscale of each pixel based on a statistical distribution function, a curve or continuous segments. In yet another embodiment of executing step 260, the post-processing procedure includes performing a dynamic range adjusting procedure and an image-enhancing procedure on the ultrasound sample image M2 according to the foreground and background information of the output image M5, thereby generating an improved ultrasound sample image M6. After performing the dynamic range adjusting procedure and the image-enhancing procedure, the foreground image (the image within the range of interest) of the resultant improved ultrasound sample image M6 can be represented with more appropriate grayscale values, while the background image (the image outside the range of interest) of the resultant improved ultrasound sample image M6 can be removed or inhibited. The foreground and background information of the output image M5 is associated with the threshold value TH1 and TH2, which may be determined by the user or by the software program of the ultrasound detection system 100. However, the implementation of the post-processing procedure does not limit the scope of the present invention.

The ultrasound detection system 100 may acquire information within its detecting range using various probe-scanning methods, such as using a linear-array scan method, a convex-array scan method, or a phased-array scan method. Generally, within the detecting range of the ultrasound detection system 100, the distances between a specific sampling point and its neighboring sampling points residing on the neighboring horizontal and vertical scan lines may be different. Therefore, the scan converter 50 is configured to translate the improved ultrasound sample image M6 into an ultrasound luminance image M7 with pixels lying in a regular raster grid pattern, thereby providing the input geometry of each sampling point within the detecting range of the ultrasound detection system 100.

In conclusion, the present ultrasound detection system 100 can remove or inhibit low echo background and high echo noises while retaining or enhancing high echo regions of a specific size, thereby improving the quality of ultrasound images.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of improving quality of ultrasound images, comprising:
    receiving an ultrasound sample image;
    performing a noise reduction procedure on the ultrasound sample image for generating a noise-reduced ultrasound sample image;
    performing an binarization procedure on the noise-reduced ultrasound image based on a first threshold value for generating a binary image, wherein the binary image includes at least one pixel with a grayscale equal to a foreground value and at least one pixel with a grayscale equal to a background value different from the foreground value;
    performing a foreground expansion procedure on the binary image based on the ultrasound sample image and a second threshold value smaller than the first threshold value for generating an output image, wherein the foreground expansion procedure includes:
        determining whether a grayscale of a first pixel located on a first location in the ultrasound sample image is larger than the second threshold value, whether a grayscale of a second pixel located on the first location in the binary image is equal to the foreground value, and whether at least one pixel with a grayscale equal to the foreground value exists within a neighboring region in the binary image, wherein the second pixel is located within the neighboring region;
        setting a grayscale of a third pixel located on the first location in the output image to the foreground value when determining that the grayscale of the first pixel is larger than the second threshold value and that the at least one pixel with the grayscale equal to the foreground value exists within the neighboring region in the binary image; and
    performing a post-processing procedure on the ultrasound sample image according to foreground and background information of the output image for generating an improved ultrasound sample image.

2. The method of claim 1, further comprising:
    setting the grayscale of the third pixel to the background value when determining that no pixel with a grayscale equal to the foreground value exists within the neighboring region.

3. The method of claim 1, further comprising:
    setting the grayscale of the third pixel to the background value when determining that the grayscale of the first pixel is not larger than the second threshold value and that the grayscale of the second pixel is not equal to the foreground value.

4. The method of claim 1, further comprising:
    setting the grayscale of the third pixel to the foreground value when determining that the grayscale of the second pixel is equal to the foreground value.

5. The method of claim 1, wherein the binarization procedure comprises:
    setting a grayscale of a fourth pixel located on a second location in the binary image to the foreground value when a grayscale of a fifth pixel located on the second location in the noise-reduced ultrasound sample image is larger than the first threshold value; and
    setting a grayscale of a sixth pixel located on a third location in the binary image to the background value when a grayscale of a seventh pixel located on the third location in the noise-reduced ultrasound sample image is not larger than the first threshold value.

6. The method of claim 1, further comprising:
    performing a scan conversion procedure on the improved ultrasound sample image for generating an ultrasound luminance image with pixels lying in a raster grid pattern.

7. The method of claim 1, wherein performing the noise reduction procedure on the ultrasound sample image comprises:
    generating a downsized image by shrinking the ultrasound sample image by a predetermined factor;
    filtering out noises in the downsized image; and
    enlarging the noise-reduced downsized image by the predetermined factor for generating the noise-reduced ultrasound sample image.

8. The method of claim 1, further comprising:
    performing an image-enhancing procedure on all pixels of the ultrasound sample image according to the foreground and background information of the output image for generating the improved ultrasound sample image, wherein the image-enhancing procedure comprises:
        decreasing one or multiple grayscales of one or multiple first specific pixels in the ultrasound sample image wherein the one or multiple first specific pixels correspond to one or multiple pixels in the output image each with a grayscale different from the foreground value; and
        increasing one or multiple grayscales of one or multiple second specific pixels in the ultrasound sample image wherein the one or multiple second specific pixels correspond to one or multiple pixels in the output image each with a grayscale equal to the foreground value.

9. The method of claim 1, wherein:
    performing the post-processing procedure on the ultrasound sample image comprises setting one or multiple grayscales of one or multiple specific pixels in the ultrasound sample image to a predetermined value for generating the improved ultrasound sample image;
    the predetermined value is not larger than the second threshold value; and
    the one or multiple specific pixels correspond to one or multiple pixels in the output image each with a grayscale different from the foreground value.

10. A method of improving quality of ultrasound images, comprising:

receiving an ultrasound sample image;

performing a noise reduction procedure on the ultrasound sample image for generating a noise-reduced ultrasound sample image;

performing an binarization procedure on the noise-reduced ultrasound image based on a first threshold value for generating a binary image, wherein the binary image includes at least one pixel with a grayscale equal to a foreground value and at least one pixel with a grayscale equal to a background value different from the foreground value;

performing a foreground expansion procedure on the binary image based on the ultrasound sample image and a second threshold value smaller than the first threshold value for generating an output image, wherein the foreground expansion procedure includes:

determining whether a grayscale of a first pixel located on a first location in the ultrasound sample image is larger than the second threshold value and whether a grayscale of a second pixel located on the first location in the binary image is equal to the foreground value;

setting a grayscale of a third pixel located on the first location in the output image to the foreground value when determining that the grayscale of the second pixel is equal to the foreground value; and generating an improved ultrasound sample image by decreasing one or multiple grayscales of one or multiple specific pixels in the ultrasound sample image, wherein the one or multiple specific pixels correspond to one or multiple pixels in the output image each with a grayscale different from the foreground value.

11. The method of claim 10, further comprising:

determining whether at least one fourth pixel with a grayscale equal to the foreground value exists among all neighboring pixels of the second pixel when determining that the grayscale of the second pixel is not equal to the foreground value;

setting the grayscale of the third pixel in the output image to the foreground value when determining that the grayscale of the first pixel is larger than the second threshold value and that the at least one fourth pixel with the grayscale equal to the foreground value exists among all neighboring pixels of the second pixel.

12. The method of claim 11, further comprising:

setting the grayscale of the third pixel to the background value when determining that the grayscale of the second pixel is not equal to the foreground value and that the no pixel with a grayscale equal to the foreground value exists among all neighboring pixels of the second pixel.

13. The method of claim 10, further comprising:

setting the grayscale of the third pixel to the background value when determining that the grayscale of the first pixel is not larger than the second threshold value and that the grayscale of the second pixel is not equal to the foreground value.

14. The method of claim 10, wherein the binarization procedure comprises:

setting a grayscale of a fifth pixel located on a second location in the binary image to the foreground value when a grayscale of a sixth pixel located on the second location in the noise-reduced ultrasound sample image is larger than the first threshold value; and setting a grayscale of a seventh pixel located on a third location in the binary image to the background value when a grayscale of an eighth pixel located on the third location in the noise-reduced ultrasound sample image is not larger than the first threshold value.

15. The method of claim 10, further comprising:

performing a dynamic range adjusting procedure and an image-enhancing procedure on the ultrasound sample image based on the foreground and background information of the output image for generating the improved ultrasound sample image.

16. The method of claim 10, further comprising:

performing a scan conversion procedure on the improved ultrasound sample image for generating an ultrasound luminance image with pixels lying in a raster grid pattern.

17. The method of claim 10, wherein performing the noise reduction procedure on the ultrasound sample image comprises:

generating a downsized image by shrinking the ultrasound sample image by a predetermined factor;

filtering out noises in the downsized image; and enlarging the noise-reduced downsized image by the predetermined factor for generating the noise-reduced ultrasound sample image.

18. The method of claim 10, further comprising:

increasing one or multiple grayscales of one or multiple specific pixels in the ultrasound sample image for generating the improved ultrasound sample image, wherein the one or multiple specific pixels correspond to one or multiple pixels in the output image each with a grayscale equal to the foreground value.

19. The method of claim 10, further comprising:

setting one or multiple grayscales of one or multiple specific pixels in the ultrasound sample image to a predetermined value for generating the improved ultrasound sample image, wherein:

the predetermined value is not larger than the second threshold value; and the one or multiple specific pixels correspond to one or multiple pixels in the output image each with a grayscale different from the foreground value.

20. An ultrasound detection system, comprising:

an ultrasound emitter configured to send an ultrasound signal;

an ultrasound receiver configured to receive an echo signal which is the ultrasound signal reflected by an object;

an operational circuit configured to provide an ultrasound sample image associated with the object according to the ultrasound signal and the echo signal;

a scan converter configured to convert the ultrasound sample image into an ultrasound luminance image with pixels lying in a raster grid pattern; and an image processor configured to:

perform a noise reduction procedure on the ultrasound sample image for generating a noise-reduced ultrasound sample image;

perform an binarization procedure on the noise-reduced ultrasound image based on a first threshold value for generating a binary image, wherein the binary image includes at least one pixel with a grayscale equal to a foreground value and at least one pixel with a grayscale equal to a background value different from the foreground value;

perform a foreground expansion procedure on the binary image based on the ultrasound sample image and a second threshold value smaller than the first threshold value for generating an output image, wherein the foreground expansion procedure includes:

determining whether a grayscale of a first pixel located on a first location in the ultrasound sample image is larger than the second threshold value, whether a grayscale of a second pixel located on the first location in the binary image is equal to the foreground value, and whether at least one pixel with a grayscale equal to the foreground value exists within a neighboring region in the binary image, wherein the second pixel is located within the neighboring region;

setting a grayscale of a third pixel located on the first location in the output image to the foreground value when determining that the grayscale of the second pixel in the binary image is equal to the foreground value;

setting the grayscale of the third pixel in the output image to the foreground value when determining that the grayscale of the first pixel is larger than the second threshold value and that the at least one pixel with the grayscale equal to the foreground value exists within the neighboring region in the binary image;

setting the grayscale of the third pixel in the output image to the background value when determining that the grayscale of the second pixel in the binary image is equal to the background value and that the grayscale of the first pixel is not larger than the second threshold value;

setting the grayscale of the third pixel in the output image to the background value when determining that no pixel with a grayscale equal to the foreground value exists within the neighboring region in the binary image; and decreasing one or multiple grayscales of one or multiple specific pixels in the ultrasound sample image for generating an improved ultrasound sample image, wherein the one or multiple specific pixels correspond to one or multiple pixels in the output image each with a grayscale different from the foreground value.

\* \* \* \* \*